United States Patent [19]

Goïcoechea

[11] Patent Number: 4,748,392
[45] Date of Patent: May 31, 1988

[54] SERVO-CONTROL SYSTEM FOR THE STEERABLE FRONT WHEELS OF A VEHICLE

[75] Inventor: José-Raymond Goïcoechea, Blagnac, France

[73] Assignee: Aerospatiale Societe Nationale Industrielle, Paris, France

[21] Appl. No.: 46,183

[22] Filed: May 5, 1987

[30] Foreign Application Priority Data

May 5, 1986 [FR] France .................... 86 06472

[51] Int. Cl.$^4$ ................................................ G05B 5/01
[52] U.S. Cl. ...................................... 318/611; 244/50; 91/176
[58] Field of Search .......................... 318/611; 244/50; 91/176

[56] References Cited

U.S. PATENT DOCUMENTS 3,885,759  5/1975  Lear ...................................... 244/50
4,313,364  2/1982  Blinwe et al. ........................ 91/176

Primary Examiner—William M. Shoop, Jr.
Assistant Examiner—M. Bergmann
Attorney, Agent, or Firm—Fisher, Christen & Sabol

[57] ABSTRACT

A servo-control system is provided for the steerable front wheels of a vehicle, particularly the steerable nose gear of an aircraft, at least the lower part of which having at least one wheel may rotate about its longitudinal axis. This system includes a high pass filter device whose input receives a signal containing at least a part representative of the oscillations about its longitudinal axis to which said lower part of said nose gear is subjected and whose output is connected to a device for subtracting the output signal of said high pass filter from said difference between said order and said signal representative of the real orientation, and the pass bank of said high pass filter covers the natural oscillation frequency of said lower part of the gear about its longitudinal axis.

4 Claims, 3 Drawing Sheets

SERVO-CONTROL SYSTEM FOR THE STEERABLE FRONT WHEELS OF A VEHICLE

BACKGROUND OF THE INVENTION

The present invention relates to a servo-control system for the steerable front wheels of a vehicle, particularly the steerable nose gear of an aircraft travelling over the ground.

It is known that, within a given range of values of the speed of a vehicle, the steering wheels thereof are subjected to a set of complex movements which result in the floating of said steering wheels. This phenomenon is generally designated by the term shimmying and it adversely affects the efficiency and accuracy of steering said vehicle along a desired path.

Furthermore, it is known that the control devices of servo-control systems are subject, because of their very closed loop structure, to instability phenomena.

Consequently, when, as is the case for aircraft, the steerable front wheels of a vehicle are controlled by a servo-control system, the combination of the shimmying effects and the instability of the corresponding control device may make the path of the vehicle uncontrollable. Thus it may cause an aircraft travelling over the ground to leave the taxiing lane during landing or take off. The fact of leaving the taxiing lane may result in destruction of the aircraft and of course injuries, possibly fatal, to the passengers and to the crew members of said aircraft.

Very often, the servo-control system for the steerable nose gear of an aircraft is of the electrohydraulic type and attempts have already been made to overcome the above drawbacks by using, in such systems, a hydraulic jack with opening distributor slide valve. However, such a solution is not satisfactory for it can only remedy shimmying movements corresponding to small imbalances of the nose gear and is totally inefficient when considerable imbalances appear, for example in the case of stripping of a tire of said wheels. In addition, it considerably impairs the accuracy of steering by increasing the time constant of the servo-control, which is particularly disadvantageous when the steering of the aircraft is controlled by the automatic pilot.

The aim of the present invention is to overcome these drawbacks and to provide a servo-control system for the steerable front wheels of a vehicle which is at one and the same time accurate, stable and insensitive to shimmying.

SUMMARY OF THE INVENTION

To this end, in accordance with the invention, the servo-control system for the steerable front wheels or nose gear of a vehicle, at least a lower part of which having at least one wheel may rotate about its longitudinal axis, of the type including:

means for generating an electric order representative of a desired orientation for said lower part of said nose gear;

actuation means for causing rotation of said lower part of said nose gear;

means for controlling said actuation means;

means for detecting the real orientation of said lower part of said nose gear generating an electric signal representative of said real orientation; and means for subtracting said signal from said order and feeding the difference obtained to said control means which, through said actuation means, cause said lower part of said gear to rotate correspondingly, is remarkable;

in that it includes a high pass filter whose input receives a signal containing at least a representative part of the oscillations, about its longitudinal axis, to which said lower part of said nose gear is subjected and whose output is connected to a device for subtracting the output signal of said high pass filter from the difference between said order and said signal representative of the real orientation; and in that the pass band of said high pass filter covers the natural oscillation frequency of said lower part of the gear about its longitudinal axis.

Thus, with the invention, the high frequency high amplitude shimmy oscillations are eliminated from the error signal of said servo-control system. Thus the dynamic response (at high frequency) of the system is improved, without impairing its accuracy. Thus a solution is provided to the problem involving paradoxically the accuracy, the stability and the shimmy. Thus the high amplitude vibrations may be at least partially suppressed which arise in the speed range of the vehicle surrounding the speed value which corresponds to the natural frequency of the servo-control system, while having a stable servo-control with a gain margin of at least 6 dB.

It is known that the natural frequency of such a lower part of the steerable nose gear is related to the rotational stiffness which the control means impose on this lower part and on the mass thereof. More precisely, the square of the pulsations corresponding to this natural frequency is equal to the ratio of such a stiffness and such a mass.

For example, in the case where the natural frequency of the lower part of the nose gear is 16 Hz, for the cut off frequency of the high pass filter a value of the order of 8 Hz is chosen. Thus, the high pass filter only lets through the frequencies higher than 8 Hz and thus eliminates these frequencies from the error signal of the servo-control.

In a first embodiment, the input of the high pass filter receives the whole of the difference between said order and said signal representative of said real orientation of the lower part of the front gear. Because of its transmission characteristics, the high pass filter introduces no correction for the frequencies lower than its cut off frequency. On the other hand, it eliminates from the error signal of the servo-control the whole of the frequencies higher than its cut off frequency.

In a variant of construction, relating to the case in which said actuation means include at least one double acting jack, said system includes means for continuously sensing the pressure difference between the two chambers of said jack and said pressure differences applied to the input of said high pass filter. It is evident that the variation of this pressure difference is representative of the oscillations to which said lower part of the steerable nose gear is subjected.

BRIEF DESCRIPTION OF THE DRAWINGS

The Figures of the accompanying drawings will better show how the invention may be constructed. In these Figures, identical references designate similar elements.

DESCRIPTION OF THE PREFERRED EMBODIMENTS

Figure 1:
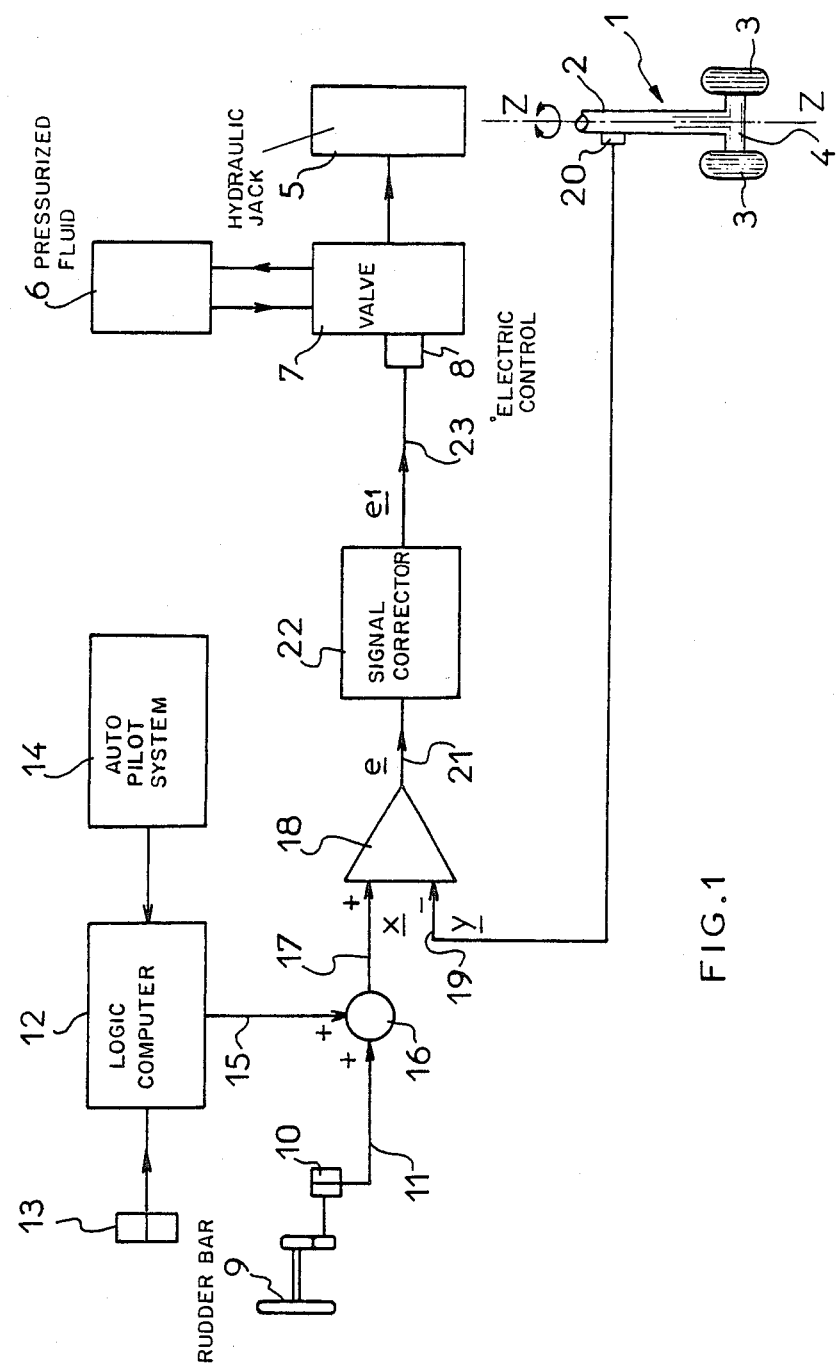
FIG. 1 is the block diagram of one example of construction of the servo-control system of the invention.

The servo-control system shown schematically in FIG. 1 is intended to control the steering of the steering gear 1 of an aircraft (not shown). For this, said steering gear 1 includes a gear strut 2 mounted for rotation with respect to the rest of the aircraft and said nose gear, about a vertical axis Z—Z. For example, said nose gear is of the type having at its lower part two twinned wheels 3 rotating about a double axle 4 orthogonal to the gear strut 2. The rotation of the gear strut 2 about the axis Z—Z is obtained through actuation means 5, for example a hydraulic jack fed with pressurized fluid from a source 6, through a servovalve 7 to an electric control 8.

A hand wheel 9, available to the pilot (or copilot), is associated with an electric generator 10, for example of the rheostat type, capable of generating at its output 11 an electric command corresponding to a voluntary orientation of said hand wheel 9 and representative of a desired orientation for the lower part 2, 3, 4 of the nose gear 1 about its axis Z—Z.

In addition, a logic computer 12 receives steering control orders, on the one hand, from the rudder bar 13 at the disposition of the pilot (or copilot) and, on the other hand, from the automatic piloting system 14. This, when the pilot actuates the rudder bar 13 for controlling the rudder or else when the automatic piloting system guides the aircraft on the ground, an electric steering control order appears at the output 15 of the logic computer 12.

The two orders appearing at the outputs 11 and 15 are added in a summator 16 which feeds a resultant order x to the positive input 17 of a differential amplifier 18.

Furthermore, the negative input 19 of the differential amplifier 18 receives an electric signal y from a sensor 20, mounted on the gear strut 2 and capable of indicating the real instantaneous orientation of the lower part 2, 3, 4 of the nose gear 1 about axis Z—Z.

Consequently, at the output 21 of the differential amplifier 18 there appears the control signal (or error signal)

$$e = G(x-y)$$

in which expression G designates the gain of the differential amplifier 18.

According to the invention, the control signal e is fed to the correction device 22 which forms, from the signal e, a corrected signal e1 which it feeds to the input 23 of the servovalve 8.

Before describing the correction device 22, forming the subject of the present invention, in greater detail, the operation of the system will be examined formed of only elements 1 to 21, in which the error signal e appearing at the output 21 of the differential amplifier 18 is applied directly to the input 23 of the control 7 for the servovalve 8.

In such a system 1-21, in a way known per se, the servo-control for orientating gear 1 to the desired value x, which may be fixed or variable, results from an oscillation of the lower part 2, 3, 4 of said gear 1 about the axis Z—Z, on each side of the position corresponding to said value x, under the action alternately in one direction then in the other of jack 5. Consequently, the signal y is alternating.

The signal e is therefore itself alternating. It is moreover this method of operation, inherent in the principle of a servo-control system of this type, which may raise difficulties insofar as the stability and/or accuracy of the servo-control are concerned, even when no forced oscillation about the axis Z—Z is introduced because of wheels 3 travelling over the ground.

Now, if, because of the wheels 3 rolling over the ground, the lower part 2, 3, 4 of gear 1 is subjected to forced oscillations, such as those for example resulting from the appearance of the shimmy phenomenon, the sensor 22 takes these forced oscillations into account, in frequency and in amplitude. Consequently, the alternating signal y may assume high amplitudes and frequencies, so that the control signal e for the servovalve 7 undergoes variations such that jack 5, taking into account its operational inertia, may no longer act sufficiently rapidly on gear strut 1 for compensating said forced oscilaltions. The servo-control is then no longer provided and the aircraft may deviate from the travel path with the pilot, through members 9 or 13) or which the automatic piloting device 14 might desire to impose thereon. A turn-off may result therefrom.

Even in the case where these forced vibrations are not sufficiently high to cause an accident, they are troublesome and dangerous, possibly causing take off interruptions or damage through vibrations, particularly insofar as the radio or navigational equipment is concerned disposed in the front part of the aircraft.

Since these forced oscillations come essentially from the imbalances of wheels 3 travelling over the ground, their frequency is related to the travelling speed of the aircraft. Their amplitude depends on the mass of the whole of the rotary lower part 2, 3, 4 of gear 1 and on the rotational rigidity of this rotary assembly 2, 3, 4 with respect to the rest of said nose gear 1.

More precisely, if the behavior of the rotary assembly 2, 3, 4 is analyzed mathematically, it can be determined, in a way known per say, that said rotary assembly 2, 3, 4 has a natural oscillation frequency whose pulsation w is equal to the square root of the ratio between the hydraulic stiffness R which jack 5 confers on the rotary assembly 2,3,4 with respect to the rest of said nose gear 1 and the mass M of this rotary assembly. Thus, $$w = \left(\frac{R}{M}\right)^{\frac{1}{2}}$$

Also in a way known per se, this stiffness R is calculated from the expression:

$$R = \frac{2 \cdot B \cdot S^2}{V}$$

in which:

B is the compressibility modulus of the hydraulic fluid delivered by source 6 to jack 5;

S is the area of a section of jack 5; and

V is the total volume of hydraulic fluid admitted into jack 5.

Experience and calculation show that the amplitude of the forced oscillation applied to the rotary assembly 2, 3, 4 of the steerable gear 1 passes through a maximum when the frequency of said forced oscillations is equal to the natural frequency of said rotary assembly 2, 3, 4, that is to say when the speed of the aircraft passes through a value giving to said oscillations a frequency equal to said natural frequency.

The device 22 of the invention is intended to overcome these drawbacks and considerably reduce, if not eliminate, the amplitude of the forced oscillations during passage of said speed value corresponding to the natural frequency of said rotary assembly 2, 3, 4.

Figure 2:
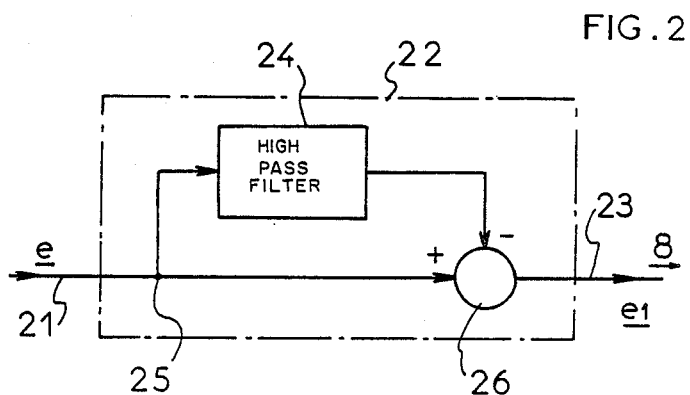
FIG. 2 shows one embodiment of the correction means of the invention.

In the embodiment of device 22 shown in FIG. 2, a high pass filter 24 is provided whose input is connected (at 25) to the output 21 of the differential amplifier 18 and whose output is connected to the negative input of a subtractor 26. The positive input of subtractor 26 is connected to point 25 and the output of this subtractor 26 is connected to the input 23 of the servovalve 8. Thus, the high pass filter 24 is mounted in parallel across the connection 21-23 and receives the error signal e. Its cut off frequency is chosen at a value lower than the natural frequency of the assembly 2, 3, 4.

Thus, for low frequencies less than this cut off frequency, the high pass filter acts like a cut off and feeds no signal to the subtractor 26. The signal e1 at the input 23 of servovalve 8 is therefore identical to the error (or control) signal e at the output 21 of the differential amplifier 18.

On the other hand, for all the frequencies of signal e greater that its cut off frequency, the high pass filter 24 is enabled so that its high frequencies are subtracted from the signal e in subtractor 26. Signal e1 is then the signal e from which the high frequencies have been removed.

Thus, despite the appearance of shimmying, wheels 3 may be guided efficiently by the servo-control system, which eliminates the effects thereof.

Figure 3:
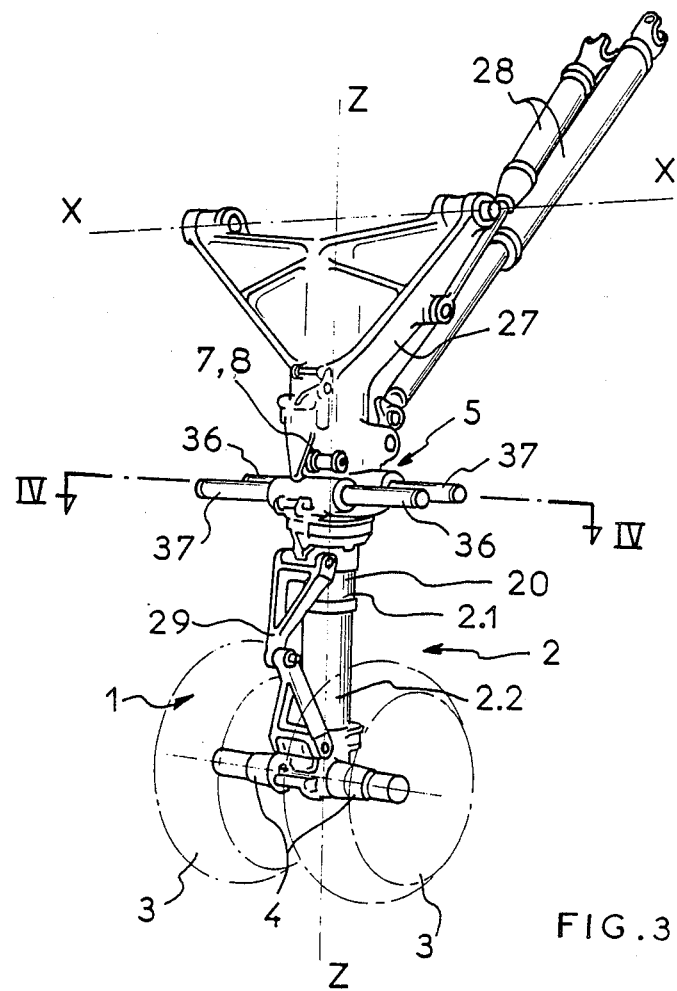
FIG. 3 is a perspective view of the steerable nose gear of an aircraft.

In FIG. 3, an embodiment has been shown of a steerable nose gear 1 for an aircraft usable for implementing the present invention.

The steerable nose gear 1 includes a frame 27 mounted for pivoting about a transverse axis Z—Z of the aircraft and pivotable between a retracted position (not shown) in which said gear is housed inside a wheel well of the aircraft and extended position (shown in FIG. 3) in which said gear 1 has come out of its housing, with wheels 3 bearing on the ground and axis Z—Z being for example vertical. Gear 1 is caused to pass from one of said positions to the other by means of jacks 28, pivotally mounted at one of their ends to the structure of the aircraft and at their other ends to frame 27.

The gear strut 2 is mounted for rotation with respect to frame 27, about axis Z—Z and it includes a longitudinally rigid tube 2-1 connected to frame 27 and incorporating the orientation sensor 20 and a tube 2-2 of resiliently variable length connected on one side to the rotary tube 2-1 and on the other to the double axle 4 and two wheels 3. Compass legs 29 connect together parts 2-1 and 2-2 of the gear strut 2.

Figure 4:
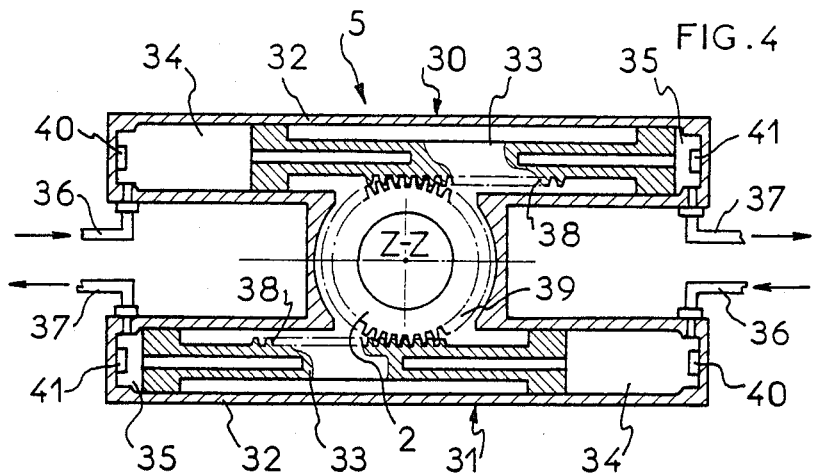
FIG. 4 is a schematical section through IV—IV of FIG. 3 illustrating the hydraulic actuation means for causing rotation of the nose gear of FIG. 3.

Jack 5 is inserted between the pivoting frame 27 and tube 2-1. As may be seen in the schematical section of FIG. 4, this jack 5 includes two elementary double acting jacks 30 and 31. Each jack 30 or 31 includes a cylinder 32 inside which is housed a floating piston 33 defining, in said cylinder 32, two end chambers 34 and 35. Chambers 34 are connected to the pressurized fluid source 6 by connections 36. Similarly, chambers 35 are connected to said source 6 by connections 37.

Each piston 33 includes a rack part 38 engaged with a ring gear 39 coaxial to the gear strut 2 and interlocked therewith. Jacks 30 and 31 are disposed parallel to each other on each side of said gear strut 2 and are mounted so that their pistons move in opposite directions to each other when they cooperate for causing said gear strut 2 to rotate in the same direction. Thus, the chambers 34 of the two jacks 30 and 31 are diametrically opposite each other with respect to gear strut 2 and are fed with or exhausted of pressurized fluid simultaneously.

In at least one of the two chambers 34 there is provided a pressure sensor 40 capable of delivering the pressure of the fluid which is therein. Similarly, in at least chamber 35 of jack 30, 31 whose chamber 34 is equipped with a pressure sensor 40, there is disposed a pressure sensor 41 measuring the fluid pressure. Thus, by means of a subtractor 42, see also FIG. 5, it is possible to know the difference $\Delta P$ of the pressures reigning respectively inside chambers 34 and 35 of at least one of the jacks 30 or 31, by connecting the outputs of the sensors concerned 40 and 41 to the inputs of said subtractor 42.

It will be readily understood that the variations in the pressure difference $\Delta P$ is representative of the oscillations to which the assembly 2, 3, 4 is subjected about the axis Z—Z.

Figure 5:
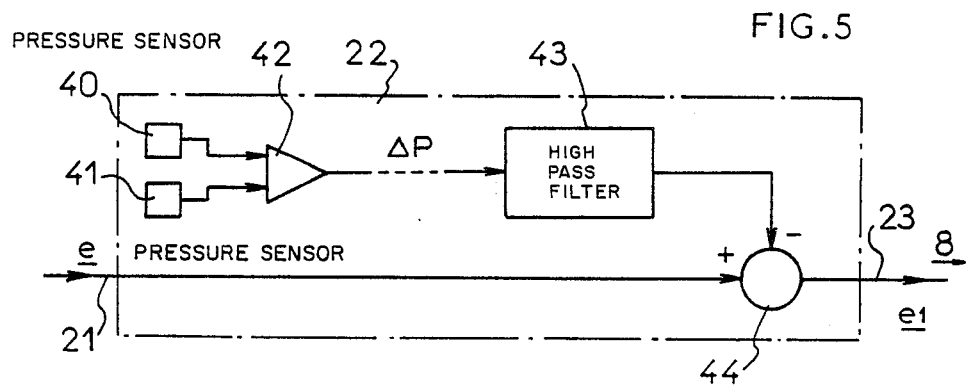
FIG. 5 shows a variant of construction of the correction means of the invention, associated with the nose gear of FIG. 3 and with the actuation means of FIG. 4.

Thus, in the embodiment of device 22 shown in FIG. 5, a high pass filter 43 receives the signal $\Delta P$ at its input. The output of the high pass filter 43 is connected to the negative input of a subtractor 44 whose positive input is connected to the output 21 of the differential amplifier 18 and whose output is connected to the input 23 of the servovalve 8.

Thus, when the frequency of the signal $\Delta P$ (representative of the oscillations of the assembly 2,3,4) exceeds the cut off frequency of filter 43, this signal $\Delta P$ is subtracted from signal e for delivering the corrected signal e1 to the servovalve. This signal e1 is therefore freed of the high disturbing frequencies. The result obtained is therefore similar to that obtained by the device of FIG. 2.

Preferably, the transfer function, in Laplacian form, of the high pass filter 24 and 43 is of the type $$\frac{k\,Tp}{1 + Tp}$$

in which expression:

k is a constant

T is the time constant p is Laplace's variable.

It will be noted that by suitably choosing the constant k, the correction made to the error signal e may be adjusted so as to obtain the control signal e1.

For example, in the device shown in FIG. 2, if k is chosen equal to 2, the transfer function of device 22 will be equal to $$\frac{1 - Tp}{1 + Tp}$$

-continued
since $$e1 = e \frac{-2tp}{1 + Tp} \ e = \frac{(1 - Tp)}{(1 + Tp)} \ e$$

What is claimed is:

1. In a servo-control system for the steerable front wheels or nose gear of a vehicle, at least a lower part of which having at least one wheel that may rotate about its longitudinal axis comprising:

means for generating an electric command representative of a desired orientation for said lower part of said nose gear;

actuation means for causing rotation of said lower part of said nose gear;

control means for controlling said actuation means;

means for detecting the real orientation of said lower part of said nose gear and for generating an electric signal representative of said real orientation; and means for subtracting said electric signal from said command and applying the difference obtained to said control means;

said control means having a high pass filter which receives an input signal containing information of the oscillations to which said lower part of said nose gear is subjected and whose output is connected to a device for subtracting the output signal of said high pass filter from the difference between said command and said signal representative of the real orientation; and the pass band of said high pass filter covering the natural oscillation frequency of said lower part of the gear about its longitudinal axis;

whereby the steerable front wheels or nose gear is rotated about its longitudinal axis.

2. The servo-control system as claimed in claim 1, wherein the input of said high pass filter receives a signal from a subtractor which has processed input signals directly from sensors in said actuator means.

3. The control system as claimed in claim 1, in which said actuating means include at least one double acting jack, further comprising means for continuously applying a signal representing the pressure difference between the two chambers of said jack to the input of said high pass filter.

4. The servo-control system as claimed in claim 1, wherein in Laplacian form, the transfer function of said high pass filter is equal to:

$$\frac{kTp}{1 + Tp}$$

in which expression:

k is a constant,

T is the time constant, and

P is Laplace's variable.

* * * * *